United States Patent [19]

Fugent et al.

[11] 4,281,796

[45] Aug. 4, 1981

[54] BATHROOM MIXING DEVICE

[76] Inventors: Elmer G. Fugent; Ruby M. Fugent, both of 10716 Ave Compadres; Shirley Kraus; Wolfgang Kraus, both of 17346 Flame Tree, all of Fountain Valley, Calif. 92708

[21] Appl. No.: 20,938

[22] Filed: Mar. 15, 1979

[51] Int. Cl.³ ............................................. B05B 7/26
[52] U.S. Cl. .................................. 239/310; 137/268; 239/574
[58] Field of Search ..................... 239/310, 312, 574; 137/268

[56] References Cited

U.S. PATENT DOCUMENTS

| 2,135,969 | 11/1938 | Donaldson | 239/310 X |
| 3,104,664 | 9/1963 | Ladd | 128/229 |
| 3,134,545 | 5/1964 | Armond | 239/312 |

Primary Examiner—Richard A. Schacher

[57] ABSTRACT

An attachment for a standard plumbing outlet is provided, and is applicable as a multipurpose mixing device. A main body has two main passages, one as an inlet and one as an outlet, communicating with a cylindrical chamber. A third, and smaller, outlet also communicates with the cylindrical chamber. A revolvable cylinder is located within the chamber for control of and routing of fluids passing therethrough.

4 Claims, 6 Drawing Figures

BATHROOM MIXING DEVICE

This invention is concerned with a bathroom device, and particularly its applicability as a multi-purpose mixing device, which can be attached to standard plumbing outlets and, the improvements in a device of this type that offers greater selectivity of control, more accurate and controllable dilution, diversity of uses by, simply changing the type of nozzle on the end of a small diameter hose, and the safety feature of a ball check to restrict flow of liquids to one direction only.

The object of this device is to provide a main body with a cylindrical chamber located near its center and two main passages communicating with the cylindrical chamber, but in opposite directions, whereby the first main passage is the inlet passage and has provisions for attachment to a standard plumbing outlet, and the second main passage being the outlet passage with provisions for a common shower head, or the like, to be attached threadedly to its end externally. A third and smaller outlet passage also communicating with the cylindrical chamber, but exiting the chamber on an angle downward and vertically, and having provisions on the exterior of the smaller outlet passage for attachment to a secondary body. An important object is the provision of a cylinder contained within the cylindrical chamber but free to revolve within the same, and having a main passage running perpendicular to its axis of rotation, and when rotated to a particular point, will cause its main passage to communicate along the same center line with the inlet and outlet passages of the main body, thereby forming a continual passage from the inlet end to the outlet end. It is important to note that while the cylinder is in the position just described, a unique sealing arrangement is provided to prevent any leakage of fluid into the smaller vertical passage. The cylinder is further provided with another passage perpendicular to, and communicating with the main passage of the cylinder.

The object then, is the provision of a cylinder within a chamber that, when rotated by a handle, shall provide the selectivity of three useful, and important positions. The first of the three positions being a full open, or free flow of liquid at normal volume and pressure as supplied by the source of the plumbing outlet. Secondly, a position whereby the direction of flow is altered and caused to flow through a smaller vertical passage and, therein causing a reduced volume of flow through the smaller vertical passage. And the third position whereby a complete restriction is caused at the main inlet passage and stopping any flow from entering the cylindrical chamber of the device. Another object is to then provide in this invention a secondary body attached to, but not permanently fixed to the main body by means of a sealant washer inserted in the grooves provided on the exterior end of the main body outlet and the interior end of the secondary body inlet, and thereby allowing the secondary body to be turned on, and around the exterior end of the main body outlet to any position desirous of the user of the device. It is a further objective to provide for a small chamber to be formed between the main member and the secondary body in which a ball is placed during assembly of the device, directly below the vertical passage of the main member. The space provided in the chamber being of a size as to allow the ball to move vertically through the vertical outlet passage in the main body, but restricting the ball to minimal movement laterally. To assure the free flow of fluids around the ball, a well, or small circular chamber, with a small vertical post situated directly in the center of the well is provided to constitute a stop, or seat for the ball and preventing it from sealing off the top of the well, and consequently, creating a stoppage of flow through the well and the fluids further progress through a subsequent lateral outlet that communicates with the well.

Thereby the importance of the ball arrangement and its function to permit a free flow of liquid in one direction only and, thereby eliminating the danger of a suction in the reverse direction that could occur should the flow of liquid be suddenly stopped at the inlet source creating a sudden drop in pressure. An object of equal importance is a semi-spherically shaped member located in the chamber between the main and secondary bodies, and seated on a sealant washer inserted into a circular groove provided at the entrance to a small vertical passage communicating with the chamber and a mixing container. There is provided as an integral part of the semi-ball a small shaft extending from the semi-ball through an opening in the wall of the secondary body and thereon externally a handle is affixed. The importance of the semi-ball, together with the integral parts of same and components thereon, constituting an ajustable valve as summarily described, is to allow the user of this device even greater variety and selectivity for mixing, diluting and controlling the volume and flow individually of both water, and liquid or disolvable powders to be mixed. It must be noted that the mixing or diluting of liquids is, in fact, accomplished in the mixing container whereby a jet-like stream enters the mixing container from the vertical passsge when the handle of the semi-ball valve is in the open position, and of further importance is that no dilution or mixed solution shall leave the mixing container through the small vertical passage provided in the bottom of the secondary member and communicating with the mixing container and the larger lateral outlet passage when the handle of the semi-ball valve is in the closed position. Therefore, the mixed solution in the mixing container is able to flow upward through the small vertical passage only after the mixing container becomes full, and then the mixed fluids are forced upwards through the small vertical passage.

Note then, that as long as the mixing container is completely filled there will also be an increase in the flow of mixed solution created by liquid induction taking place where the small vertical passage enters the larger lateral passage and caused by the lateral outlet passage being larger in diameter at that point than where the lateral passage enters the well. Summarily, the control of not only the flow of water from its source but also the control of the mixed fluids is realized by the user of this device, and since the flow of mixed fluids is not dependent on the liquid induction principle, accurate dilution is achieved even when volume and pressure are reduced at the source to a small trickle.

Provisions are then made on the exterior portion of the lateral outlet passage of the secondary body for a flexible tube to be attached. The flexible tube should then be of a length to reach the farthest point of the bath tub, or shower enclosure, and provisions for attaching various accessories to that end of the flexible tube are made.

It is a further objective that the variety and selectivity offered by the controlling features of this device are such that it can be conveniently used for a much wider variety of purposes than any other device of this class known to me.

The following detailed description will more clearly show the numerous and important advantages of this invention, particularly when considered in connection with the accompanying drawings in which;

FIG. 1 is a view showing the device attached to a standard plumbing outlet and a common shower head is shown detached from the device to more clearly show the lower portion of the device. A flexible tube is shown connected to the outlet passage on the secondary body of the device. The lower end of the tube has a common spray attachment connected to it as it, or various other attachments would be when in actual use.

FIG. 2 is a side elevational view embodying the entire device showing the connection and continuity of flow passages between the main body and the secondary body. And also showing a partial view of a standard plumbing pipe outlet, and a partial view of a standard shower head, both of which are shown threadedly attached to the main body portion of the device. Note that the three position valve in the main body is shown in the full flow position.

Figure 1:
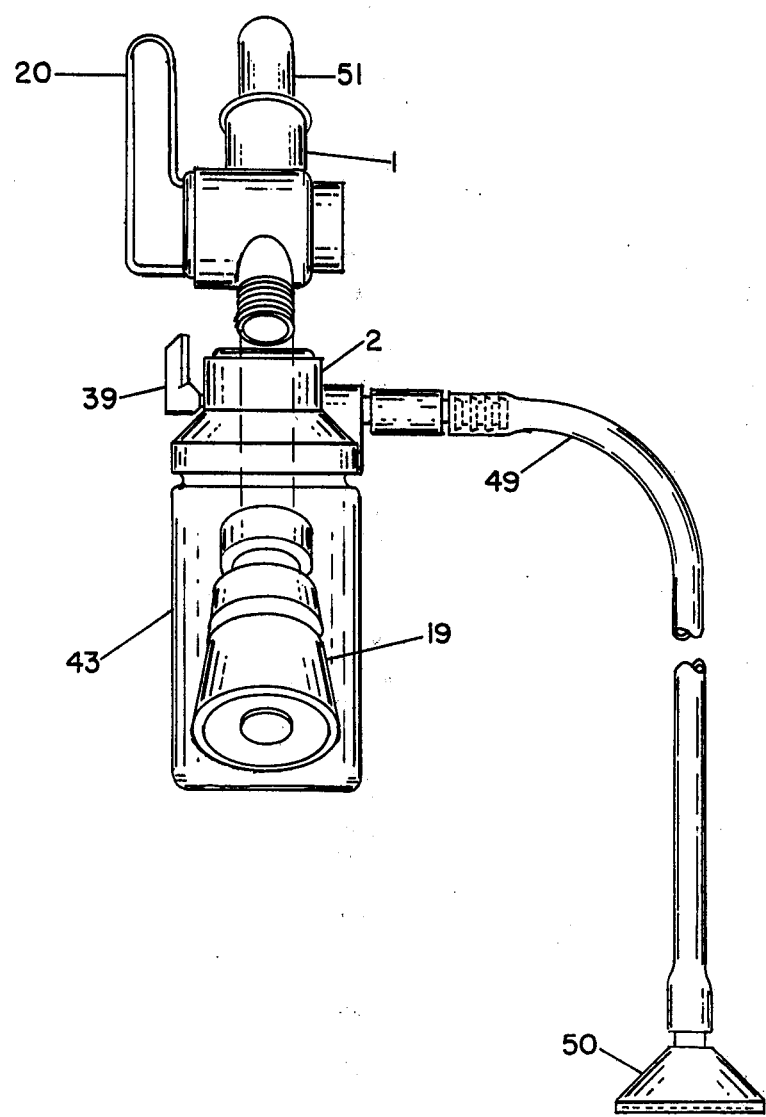
Figure 2:
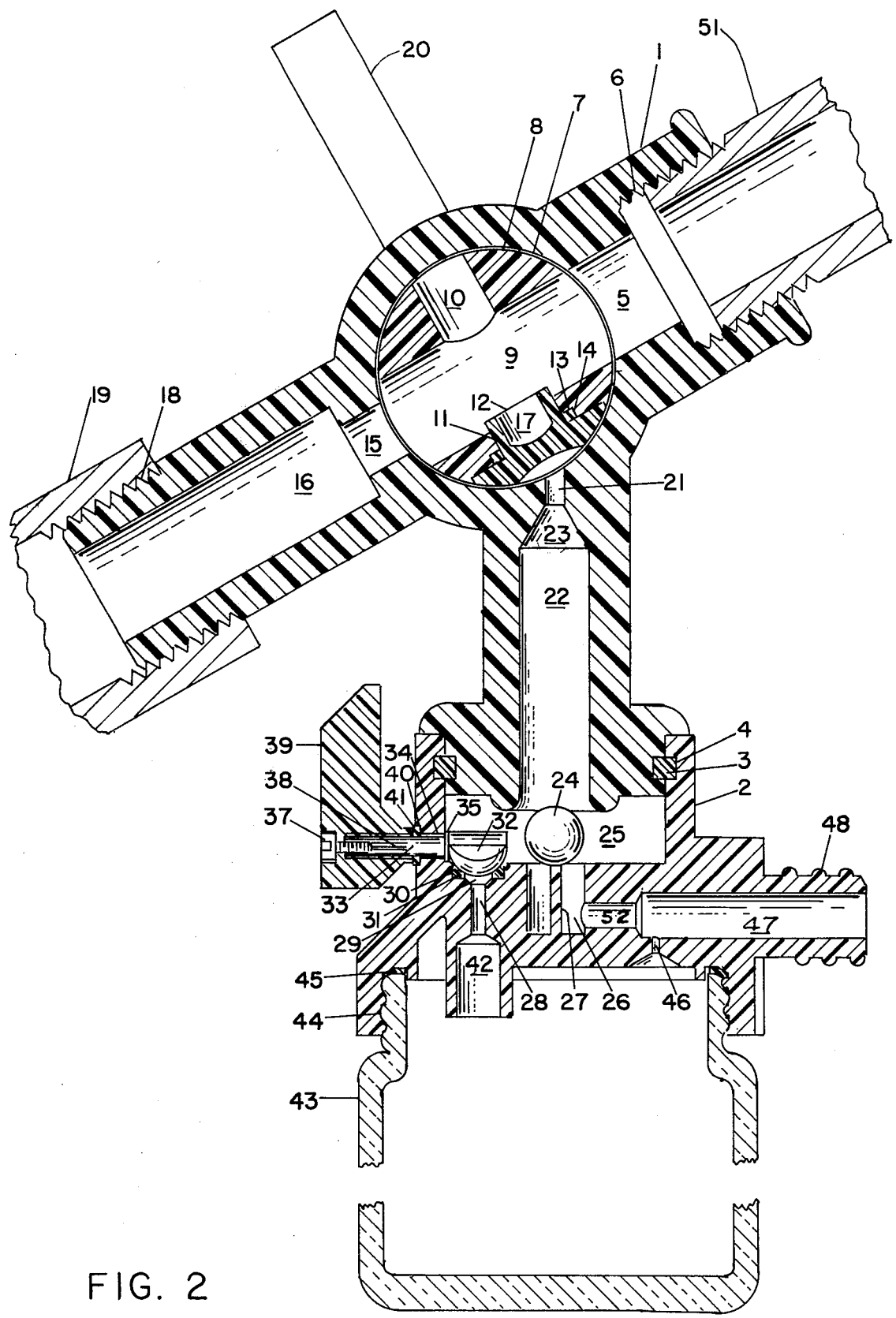

Referring now by characters of reference to the drawings, first to FIG. 2, the bath appliance is constructed of two primary bodies, the main body 1 and the secondary body 2, connected to the main body by means of a sealant washer 3 placed in the annular grooves 4 provided around the exterior of the main body vertical outlet 53 and on the interior near the top of the secondary body 2, and thereby allowing the secondary body 2 to revolve around the main body vertical outlet 53. The washer 3 is compressed when assembled to form an effective seal. The main body 1 is provided with a cylindrical chamber 7 located near its center, with a main inlet passage 5 and a main outlet passage 9 communicating with the cylindrical chamber 7 from opposite directions but along the same centerline. The main inlet passage 5 contains interior threads 6 in a portion that is slightly larger in diameter than the remainder of the passage. The threads 6 will then accommodate the exterior threads of a standard plumbing outlet 51. The main outlet passage 16 is provided with exterior threads 18 for the purpose of threadedly attaching a common shower head 19, or the like.

Figure 3:
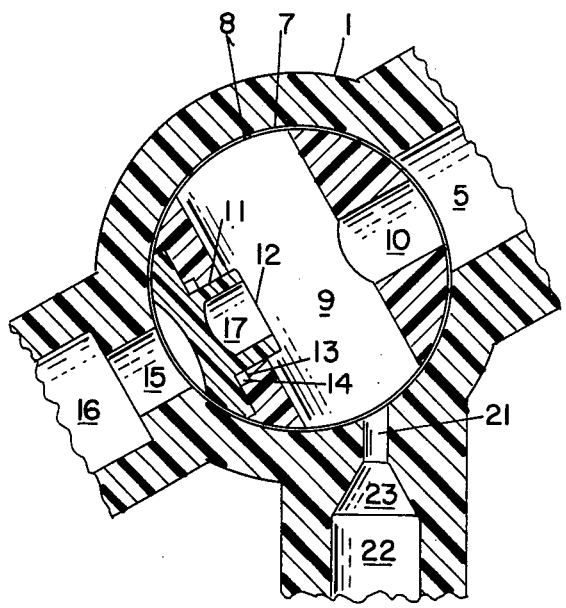
FIG. 3 is a partial cross sectional view of the main body showing the three position valve in the reduced flow position.

There is provided a cylinder 8 within the cylindrical chamber 7 with an exterior diameter slightly smaller than the interior diameter of the cylindrical chamber 7 allowing it to revolve by means of a handle 20 located on one end of the cylinder 8, and is an integral part of the cylinder. The cylinder 8 is provided with a main passage 9 running perpendicular to the axis of the cylinder 8 and of identical size as the main inlet passage 5 and the main outlet passage 16 so that revolving the cylinder 8 to a particular point will cause its main passage 9 to be in longitudinal alignment with the main inlet passage 5, and the main outlet passage 16 as shown in FIG. 2. There is provided in the cylinder 8 an opening 11 into which a sealant plug 12 is inserted. To further increase the sealing efficiency of the plug 12 a washer 13 is located in the small annular groove 14 provided in the cylinder 8. A passage 15 communicating with the cylindrical chamber 7 and the main outlet passage 16 is slightly smaller than the main outlet passage 16 so that a slight back pressure will be created within the main passage 9 of the cylinder 8. A proportionate amount of this back pressure from the flow of fluid will thereby be applied to the walls of the small chamber 17 causing it to expand slightly and push against the interior walls of the opening 11 and the interior wall of the cylindrical chamber 7 and thereby preventing any leakage of fluids into the small vertical passage 21. Another passage 10 of somewhat smaller size than the main passages is provided in the cylinder 8 and communicates with the main passage 9 of the cylinder 8 and perpendicular to the same. Revolving the cylinder 8 a full 90 degrees will then place the passages in the positions shown in FIG. 3, whereby the alternate passage 10 will now be communicating with the main inlet passage 5, and the main passage 9 of the cylinder 8 will now be communicating with the much smaller vertical passage 21 provided in the main member 1 and entering the cylindrical chamber at an angle.

Figure 4:
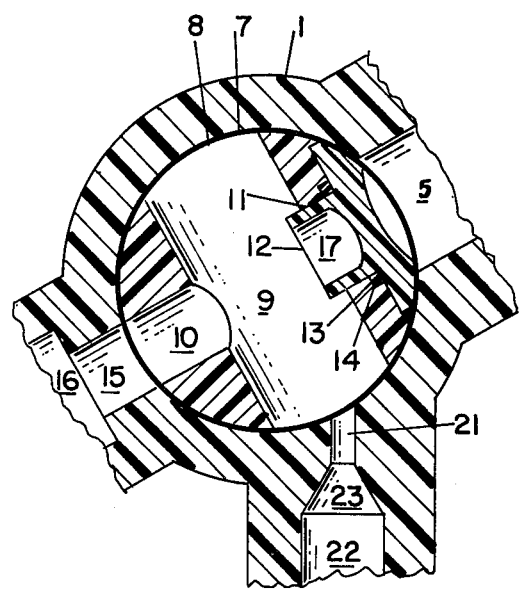
FIG. 4 is a partial cross sectional view of the main body showing the three position valve in the closed, or off position.

Revolving the cylinder 8 ninety degrees in the opposite direction the passages will then be placed in the positions as shown in FIG. 4, whereby the sealant plug 12 is positioned over the orifice of the main inlet passage 5 and causing a full stoppage of flow of liquids from the source of supply. The small vertical passage 21 being smaller than the main inlet passage 5 shall therefore restrict the flow of liquid from the source when the handle 20 of the cylinder 8 is in the restricted flow position. Passage 21 then widens to form a larger vertical passage 22. A chamber is created by design between the main body 1 and the secondary body 2 wherein a small ball 24 has been placed during assembly. The size of the ball 24 is of a diameter that will allow it to move vertically through the vertical passage 22, but is restricted in its lateral movement by the rounded outlet of the vertical passage 22. A cylindrically shaped well 26 with a post 27 rising vertically from the center of the well is provided. The post 27 will then prevent the ball 24 from closing off the entrance to the well 26 and thereby assuring a free flow of liquid into the well 26 and subsequently into the lateral outlet passage 52. The importance of the ball 24 is derived from the fact that should the free flow of liquid be stopped at the source of supply causing a sudden drop of pressure in the passages preceding the ball 24, the subsequent suction in the reverse direction would instantly cause the ball 24 to move rapidly and vertically through passage 22 to a point in the cone 23 formed between passages 22 and 21, thereby effectively stopping any adverse suction in the reverse direction. Another vertical passage 28 communicating with the chamber 25 has at its uppermost end a countersunk portion forming an inverted cone 29 and an annular groove 30 is provided therein. A sealant washer 31 is inserted in the annular groove 30 to form a seat for the rotatable semi-spherical ball type valve 32.

Figure 5:
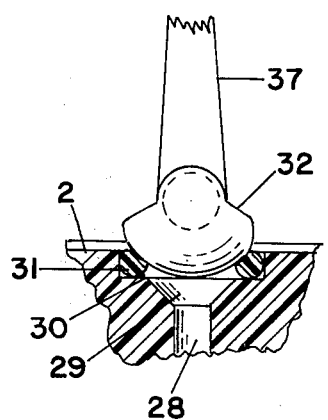
FIG. 5 is a partial cross sectional view, slightly enlarged, looking from the right and toward the left of FIG. 1, of the semi-ball, or mixing valve, shown in the closed position.
Figure 6:
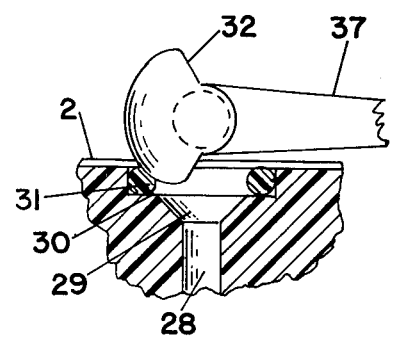
FIG. 6 is the same view as FIG. 5, but showing the semi-ball, or mixing valve in the open, or mix position.

The semi-spherical ball 32 has, as an integral part, a small shaft 33 extending from the semi-spherical ball 32 through an opening 34 in the wall of the secondary member 2. A portion of the shaft immediately next to the semi-spherical ball 32 is made slightly larger than the opening in the wall 34 and forms a shoulder 35. Interior threads are then provided in the end of the shaft that receive the small screw 37, and around the exterior of the shaft are provided small flutes 38 forming a longitudinal gear that becomes meshed with the flutes provided on the interior of the handle 39. At the exterior end of the opening 34 is a small portion of the opening that is of a slightly larger diameter forming an annular groove 40 and therein a sealant washer 41 is provided. When the handle 39 is positioned on the shaft 33 and the screw 37 is tightened, the handle will be forced against the washer 41 thereby creating an effective seal. Also, the shoulder 35 will be pulled tightly against the interior wall of the secondary member 2 and thereby sustain the shaft 33 in its proper position. FIG. 5 and FIG. 6 slightly enlarged, are provided to show more clearly the semi-spherical ball in a view looking from right to left in FIG. 2. FIG. 5 shows the semi-spherical ball in its fully closed position, and FIG. 6 views the same semi-spherical ball in the fully open, or mixing position. The vertical passage 28 proceeds downward through the secondary body 2 to a point where it widens and forms an outlet passage 42 which communicates with the mixing container 43. The mixing container is attached threadedly to the interior threads 44 at the bottom of the secondary body 2. A gasket 45 is provided in an annular flat portion of the secondary body 2 to prevent leakage beween the top rim of the mixing container 43 and the secondary body 2 when the mixing container 43 is screwed tightly. Located in the base of the secondary body 2 is a small vertical passage 46 communicating with the lateral outlet passage 47. The small vertical passage 46 being the outlet passage for the previously mixed fluids in the mixing container 43. Whereby all ummixed and undiluted fluids only shall flow from the well 26 and through the small lateral passage 52, and the larger lateral outlet passage 47, and whereby passage 47 is made larger than passage 52 at a point slightly preceding that point where passage 46 enters passage 47, a drop in pressure will occur in passage 47 and will cause a mixed and diluted solution to flow more readily through passage 46 because of liquid induction. However, this will occur only after the mixing container has become filled. External threads 48 are provided on the secondary body 2 at the outlet of lateral passage 47 to accommodate an internally threaded member affixed to the end of a flexible tube 49. The opposite end of the flexible tube would also be treated in the same manner with an internally threaded member affixed to the flexible hose to accommodate a common spray nozzle 50, douche nozzle, or other common attachments for other and various uses. The length of the flexible hose should be of a size that will reach to the farthest point of the shower or tub enclosure.

For operation and use of this device the common fitting on any standard plumbing outlet, such as a shower head 19 as shown would first be removed and the device as described herein would be threaded to the plumbing outlet 51, after which the shower head 19 would be threadedly engaged to the external threads 18 of the main member 1. The main handle would be placed in either the full open or reduced flow position as desired and the water turned on by use of the normal faucets. The temperature would be set as desired, and the device would be at once ready to use in any of the following combinations. With the main handle in the full on position, wherein none of the flow is diverted, the user would have full flow through the device, and of course through the shower head. With the main handle in the reduced flow position and the mixing handle in the closed position, the volume of flow would be reduced and the flow would be diverted to, and through the lateral outlet passages of the secondary body and on through the flexible hose. With the main handle in the reduced flow position and the mixing handle in the open, or any intermediate position, the reduced flow through the secondary body would be proportioned, whereas a portion would flow through the well 26, and into the lateral outlet passages 52 and 47, and a smaller portion would flow through the vertical passages 28 and 42 and into the mixing container, wherein under normal pressure inducement an efficient mixing of the solutions would occur. After the mixing container has become filled the mixed solutions would then be forced by pressure vertically upward through the small passage 46 and into the larger lateral outlet passage 47, wherein liquid induction would increase and further assist the flow of the mixed solution. At this point in the lateral outlet passage 47 there would also occur a further mixing and diluting of the solutions. The amount of dilution being controlled by the mixing handle from the full off, to the full on position. And lastly, with the main handle in the full off position wherein a complete stoppage will occur at the inlet passage of the main member 1. This position becomes important whereby the user now has the prerogative of interrupting the flow as many times as they wish without having to re-set their desired temperature each time.

Having described my invention, I hereby claim the following;

1. In a device of the class herein described, a main structural body containing provisions at one end for attachment to a standard plumbing outlet, and provisions at the opposite end for attachment of a common shower head, or the like, and having internal passages through both ends communicating with a cylindrical chamber near the center, a revolvable cylinder located within the cylindrical chamber having a main passage, and a double acting seal that, when fluid pressure is applied to the seal from either one of two directions, shall efficiently stop the flow of liquids at that point, a small vertical passage communicating with the cylindrical chamber at one end and a larger vertical passage at the other end, a ball, free to move vertically through the larger vertical passage to a cone formed at, and by, the juncture of the larger and smaller vertical passages, a secondary structural member attached to the main structural body and containing a chamber and having a well within the chamber, wherein a vertical post is located at the center of the well, and directly beneath the larger vertical passage of the main body, a small vertical passage communicating with the chamber and a mixing container, a small lateral passage communicating with the well at one end and opening into a larger lateral outlet passage at its opposite end, a small vertical passage communicating with the container at one end and entering into, but perpendicular to the larger lateral outlet passage.

2. All of claim one and a revolvable cylinder within a cylindrical chamber, having a main passage and alternate passages perpendicular to the main passage therein, and having when revolved, a full open position, a fully closed position, and reduced volume of flow position, for the control of and the routing of fluids passing therethrough.

3. All of claim 1 and a semi-spherical shaped ball valve in the secondary body seated over a vertical passage and exterially controlled by a handle thereby controlling the flow and quantity of fluid to a container that a solution, or disolvable powder, or the like has been previously placed, controlling the quantity and flow of mixed fluids and solutions from the container.

4. All of claim 1 and, a ball that by having limited movement in all directions laterally, thereby allowing the free flow of fluids in one direction, but shall stop any flow in the opposite direction by being free to move upward through a vertical passage to a point where the passage narrows forming a cone wherein the ball shall become restrained forming a seal within the cone.

* * * * *